US010193857B2

(12) United States Patent
Griffith

(10) Patent No.: US 10,193,857 B2
(45) Date of Patent: Jan. 29, 2019

(54) SECURE UNRESTRICTED NETWORK FOR INNOVATION

(71) Applicant: The United States of America as represented by the Secretary of the Navy, Washington, DC (US)

(72) Inventor: John B. Griffith, San Clemente, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 7 days.

(21) Appl. No.: 14/868,241

(22) Filed: Sep. 28, 2015

(65) Prior Publication Data
US 2017/0004318 A1 Jan. 5, 2017

Related U.S. Application Data

(60) Provisional application No. 62/186,916, filed on Jun. 30, 2015.

(51) Int. Cl.
*H04L 29/06* (2006.01)
*G06F 21/85* (2013.01)

(52) U.S. Cl.
CPC .......... *H04L 63/0209* (2013.01); *G06F 21/85* (2013.01); *H04L 63/105* (2013.01);
(Continued)

(58) Field of Classification Search
CPC ... H04L 63/0209; H04L 63/105; H04L 63/18; H04L 63/0227; G06F 21/85; G06F 2221/2143
(Continued)

(56) References Cited

U.S. PATENT DOCUMENTS 5,703,562 A * 12/1997 Nilsen ................. G06F 11/1625
340/286.02
5,832,212 A * 11/1998 Cragun ............. G06F 17/30867
707/E17.109
(Continued)

FOREIGN PATENT DOCUMENTS

CN 103532978 A 1/2014
CN 203480512 U 3/2014

OTHER PUBLICATIONS

Farn, Kwo-Jean et al., "A Study on the Network Isolation Security Requirements for e-Taiwan," Proceedings of the 5th WSEAS International Conference on Applied Computer Science, Hangzhou, China, Apr. 16-18, 2006; pp. 975-980.
(Continued)

*Primary Examiner* — Shahriar Zarrineh
(74) *Attorney, Agent, or Firm* — Christopher A. Monsey

(57) ABSTRACT

The present disclosure relates to a system and method for transporting data within a dual network computing system including a first workstation communicably coupled to a first storage device, and a second workstation communicably coupled to a second storage device, wherein the first storage device cannot be accessed by the second workstation, and the second storage device cannot be accessed by the first workstation. The system and method further includes a data transport server communicably coupled to the first storage device and the second storage device, wherein the data transport server is configured to be in unidirectional communication with the first storage device and in unidirectional communication with the second storage device, the data transport server being configured to purge one or more data elements from data accessed from the first storage device and transport remaining data elements to the second storage
(Continued)

device, and the second workstation is configured to access the remaining data elements from the second storage device.

17 Claims, 9 Drawing Sheets

(52) U.S. Cl.
CPC ...... *H04L 63/18* (2013.01); *G06F 2221/2143* (2013.01); *H04L 63/0227* (2013.01)

(58) Field of Classification Search
USPC .......................................................... 713/153
See application file for complete search history.

(56) References Cited

U.S. PATENT DOCUMENTS

| | | | | |
|---|---|---|---|---|
| 6,032,259 A * | 2/2000 | Nemoto | ............... | H04L 63/0209 726/3 |
| 6,317,831 B1 * | 11/2001 | King | ................... | H04L 63/0428 380/223 |
| 6,889,325 B1 * | 5/2005 | Sipman | .................. | G06Q 20/04 380/268 |
| 7,302,704 B1 * | 11/2007 | Elliott | ..................... | H04L 45/02 380/2 |
| 7,685,292 B1 * | 3/2010 | Kinsella | ............... | H04L 12/4633 709/223 |
| 8,051,147 B2 * | 11/2011 | Ni | ...................... | H04L 63/0227 709/219 |
| 8,112,469 B1 * | 2/2012 | Gershman | ............... | H04L 67/12 340/286.04 |
| 8,239,608 B1 | 8/2012 | Ginzton | | |
| 8,473,651 B1 * | 6/2013 | Sundaravel | ........... | G06F 21/305 710/1 |
| 9,560,010 B1 * | 1/2017 | Estes | ................... | H04L 63/0209 |
| 2002/0128982 A1 * | 9/2002 | Gefwert | ................ | G06Q 20/02 705/67 |
| 2003/0051054 A1 * | 3/2003 | Redlich | ............... | G06F 21/6209 709/246 |
| 2003/0169859 A1 * | 9/2003 | Strathmeyer | ..... | H04L 29/06027 379/88.17 |
| 2004/0107358 A1 * | 6/2004 | Shiakallis | ................ | G06F 21/34 726/9 |
| 2005/0033990 A1 * | 2/2005 | Harvey | ................. | H04L 63/105 726/4 |
| 2005/0044266 A1 * | 2/2005 | O'Neil | .................... | G06F 3/023 709/238 |
| 2005/0132030 A1 * | 6/2005 | Hopen | ............... | H04L 67/1008 709/223 |
| 2005/0198523 A1 * | 9/2005 | Shanbhag | ............. | H04L 49/356 726/22 |
| 2005/0238033 A1 * | 10/2005 | Sakamoto | ........... | H04L 67/2823 370/401 |
| 2006/0048218 A1 * | 3/2006 | Lingafelt | ............. | H04L 63/0227 726/11 |
| 2006/0090136 A1 | 4/2006 | Miller et al. | | |
| 2006/0095579 A1 * | 5/2006 | Arregoces | ........... | H04L 63/0227 709/229 |
| 2008/0075090 A1 * | 3/2008 | Farricker | ................ | H04L 47/10 370/395.53 |
| 2008/0235779 A1 | 9/2008 | Bogner | | |
| 2008/0244676 A1 * | 10/2008 | DaCosta | ............. | H04N 7/17318 725/116 |
| 2009/0319247 A1 * | 12/2009 | Ratcliffe, III | ...... | G09B 19/0053 703/13 |
| 2011/0047627 A1 * | 2/2011 | Sheymov | ............ | H04L 63/1425 726/26 |
| 2011/0161226 A1 * | 6/2011 | Courtion | ................ | G06Q 20/10 705/39 |
| 2011/0252116 A1 * | 10/2011 | Menoher | ............... | H04L 63/105 709/217 |
| 2012/0017279 A1 * | 1/2012 | Wakumoto | ............ | G06F 21/552 726/24 |
| 2012/0030768 A1 * | 2/2012 | Mraz | ....................... | G06F 21/85 726/26 |
| 2012/0159651 A1 * | 6/2012 | Beacham | ................ | G06F 3/023 726/34 |
| 2013/0133061 A1 | 5/2013 | Fainkichen et al. | | |
| 2013/0254878 A1 | 9/2013 | Clarke et al. | | |
| 2014/0013388 A1 * | 1/2014 | Chandrasekhar | ....... | G06F 21/70 726/3 |
| 2014/0019652 A1 * | 1/2014 | Soffer | ..................... | G06F 21/83 710/73 |
| 2014/0105043 A1 | 4/2014 | Reyes et al. | | |
| 2014/0132984 A1 * | 5/2014 | Oshima | ................. | G06F 3/1207 358/1.15 |
| 2014/0208442 A1 * | 7/2014 | Mooring | ............. | G06F 9/45533 726/30 |
| 2015/0019965 A1 * | 1/2015 | Roberts | ................. | G11B 27/28 715/716 |
| 2015/0271184 A1 * | 9/2015 | Josang | .................... | G06F 21/74 726/22 |
| 2015/0326547 A1 * | 11/2015 | Carlson | ................ | H04L 63/061 713/171 |
| 2015/0365237 A1 * | 12/2015 | Soffer | ................... | H04L 9/3234 726/20 |

OTHER PUBLICATIONS

Proceedings, 4th Australian Information Warefare & IT Security Conference "Enhancing Trust", University of South Australia, Adelaide, Australia, Nov. 20-21, 2003, Edited by SLAY, Jill; 434 pages.

* cited by examiner

SECURE UNRESTRICTED NETWORK FOR INNOVATION

CROSS-REFERENCE TO RELATED APPLICATION

This application claims priority to U.S. Provisional Application Ser. No. 62/186,916 filed on Jun. 30, 2015, the entire disclosure of which is hereby expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,255) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND OF THE DISCLOSURE

The present disclosure relates generally to a computer network and, more particularly, to a research development test and evaluation (RDT&E) network that eliminates or significantly reduces the obstacles and security policy restrictions imposed on developers and traditional networks while not compromising security and the ability for developers to access a broad range of technical content.

Computer networks typically implement varying levels of security to protect the networks from unauthorized data access or interception. An open network has limited or reduced security measures, while a closed network implements strict security measures and limits access to privileged users. For example, an open network may allow users access to Internet connectivity and other applications such as e-mail, web services, and external file transfer. A closed network may block or restrict Internet connectivity, e-mail, web services, and other communications external to the closed network. The closed network may store sensitive information that is not generally available to the general public, such as financial records, personnel records, trade secrets, and other industry or company secrets, for example. Illustratively, government agencies, intelligence communities, financial institutions, and commercial applications may use closed networks.

High levels of security in computer systems or networks and high levels of flexibility to conduct research are typically counter to each other. A completely closed network can be left relatively open if the risk of network attacks, which originate from outside the network is eliminated. For completely closed networks, inside risk, sometimes referred to as insider threat, can be mitigated with minimal hindrances to performance or development activities; this is because risks related to network security are more manageable in a closed network environment. However, one disadvantage of a completely closed network is that the closed environment blocks the user (e.g., engineers/scientists) from technical knowledge and tools outside the network that may be needed to conduct research and reduce product or software development time. For example, without access to the wealth of information made available by the Internet, projects may take much longer to complete than they otherwise would if developers have unconstrained Internet access in a closed network environment.

Transferring data from an open network to a closed network may introduce risk at the closed network of exposure to malicious code or content from the transmitting open network. Further, the risk of service attacks and system and/or data corruption is increased when the closed network receives data from an open network. Bi-directional communication between the closed network and open network may increase the likelihood of sensitive data leaking from the closed network to the open network. Therefore, open and closed networks are often physically isolated, thereby limiting the ability to transfer data between the networks.

Currently, closed networks, which are used for research and development typically, have a multitude of data access restrictions due to the various network security features incorporated by Information Technology (IT) network security personnel. These security features may either completely defeat the purpose of the research and development network, or make development so difficult that the increased time and cost to develop innovative products in such an environment far outweigh the benefit of having and using the product. Accordingly, a need exists for a method and apparatus that allows users to access information from an open network and transport that information to a closed network without fear that the transported information will cause undesired effects to closed network computing environments.

SUMMARY OF THE DISCLOSURE

According to an illustrative embodiment of the present disclosure, a dual network computing system is provided comprising a first workstation communicably coupled to a first storage device. A second workstation communicably coupled to a second storage device, wherein the second workstation does not have direct access to the first storage device, and wherein the first workstation does not have direct access to the second storage device. The computing system further includes a data transport server communicably coupled to the first storage device and the second storage device, the data transport server including a first network interface configured to receive data such that the data transport server communicates data unidirectionally with the first storage device, and a second network interface configured to transmit data such that the data transport server communicates data unidirectionally with the second storage device. The computing system further includes a first data link providing unidirectional data communication from the first storage device to the data transport server; a second data link providing unidirectional data communication from the data transport server to the second storage device; and wherein the data transport server further includes a purging module, the purging module configured to purge one or more data elements from data provided to the first storage device by way of the first work station thereby resulting in remaining data elements; wherein the data transport server transports the remaining data elements to the second storage device, the first display being unable to display the transported data elements, the second display being unable to display the data provided to the first storage device and the second workstation being configured to access the data elements transported from the second storage device.

According to a further illustrative embodiment of the present disclosure, a method of operating a dual network computing system comprising the steps of providing a first data link adapted to enable unidirectional data communication from a first storage device to a data transport server. Providing a second data link adapted to enable unidirectional data communication from the data transport server to a second storage device. Providing a data transport server including a purging module, the purging module including logic configured to at least purge data elements from data provided to the first storage device. The method further includes the steps of providing, by a first workstation, data to the first storage device; scanning, by the purging module, the data unidirectionlly communicated from the first storage device to the data transport server by way of the first data link; following the scanning step, identifying, by the purging module, one or more data elements to be purged from the data provided to the first storage device. The method further includes following the identifying step, purging, by the purging module, the one or more identified data elements wherein purging includes isolating remaining data elements from the identified data elements. Closing a connectivity switch to provide electrical communication from an open network to a closed network such that data from the first storage device can be transported to the second storage device; transporting, by the data transport server, remaining data elements from the first storage device to the second storage device wherein transporting is accomplished by way of the second data link. The method further includes the steps of opening the connectivity switch to disable electrical communication from the open network to the closed network such that data from the open network cannot be transported to the closed network; and accessing, by a second workstation on the closed network, the remaining data elements transported to the second storage device, wherein the remaining data elements cannot be accessed by the first workstation and the data provided to the first storage device cannot be accessed by the second workstation.

According to yet another illustrative embodiment of the present disclosure, a dual network computing system includes an open network portion including a first workstation communicably coupled to a first storage device; a closed network portion including a second workstation communicably coupled to a second storage device; a data transport server communicably coupled to the first storage device and the second storage device. The data transport server includes: a processor; a memory containing instructions that when executed by the processor cause the processor to: detect the addition of data provided to the first storage device by the first workstation communicably coupled to the open network; in response to detecting the addition of data provided to the first storage device, scanning the data; in response to scanning the data provided to the first storage device, identifying data elements to be purged from the data and purging the identified data elements from the data; in response to purging the data elements, transporting remaining data elements from the first storage device to the second storage device, wherein the second storage device is accessible by the second workstation communicably coupled to the closed network. The computing system further including a connectivity switch having a closed position and an open position, the connectivity switch in the closed position providing electrical communication from the open network portion to the closed network portion such that data from the first storage device on the open network portion can be transported to the second storage device on the closed network, and the connectivity switch in the open position prevents electrical communication between the open network portion and the closed network portion.

According to yet another illustrative embodiment of the present disclosure, a dual network computing system includes a first workstation communicably coupled to a first storage device and a second workstation communicably coupled to a second storage device. The computing system further includes a data transport server comprising a first network interface, a second network interface, and a purging module, said data transport server communicably coupled to the first storage device and the second storage device, said first network interface configured to receive a first plurality of data such that the first data storage device transmits said first plurality of data unidirectionally with the data transport server, said purging module is configured to purge one or more data elements from the first plurality of data based on a predetermined list of said one or more data elements to generate a second plurality of data, said second network interface is configured to transmit said second plurality of data to said second storage device such that the data transport server transmits said second plurality of data unidirectionally to the second storage device. The computing system further includes a first data link coupling the first network interface with the first work station and first storage device providing unidirectional data communication of said first plurality of data from the first storage device to the data transport server and a second data link coupling the second network interface with the second work station and second storage device providing unidirectional data communication of said second plurality of data from the data transport server to the second storage device; wherein the second workstation is configured to access, read, manipulate, and output the second plurality of data stored within the second storage device.

Additional features and the advantages of the present invention will become apparent to those skilled in the art upon consideration of the following detailed description of the illustrative embodiment exemplified the best mode of carrying out the invention as presently perceived.

BRIEF DESCRIPTION OF THE DRAWINGS

Reference will now be made to the attached drawings, wherein like reference numerals refer to like parts throughout the several views. The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF THE DRAWINGS

The invention and the various features and advantageous details thereof are explained more fully with reference to the non-limiting embodiments that are illustrated in the accompanying drawings and detailed in the following description. It should be understood that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

Figure 1:
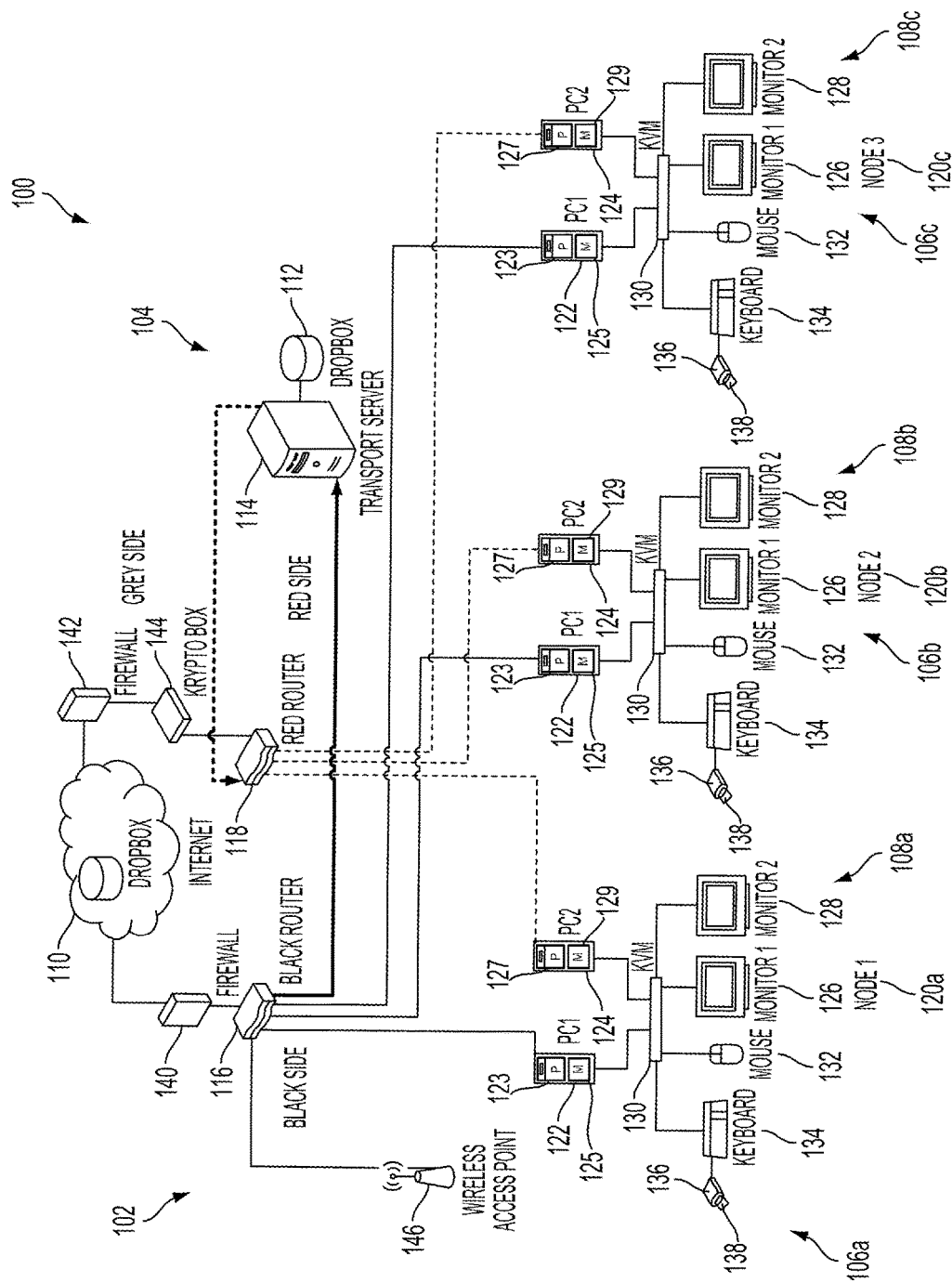
FIG. 1 is a schematic view of an illustrative dual network computing system according to the present disclosure.

FIG. 1 is a schematic view of an illustrative dual network computing system 100 of the present disclosure including a plurality of nodes 120a, 120b, 120c. Each node 120a, 120b, 120c is illustratively part of an open network (portion) 102 and a closed network (portion) 104. In the following detailed description, the open network 102 may be called "the black side", while the closed network 104 may be called "the red side".

A data transport server 114 is disposed generally intermediate open network 102 and closed network 104. Open network 102 portion of nodes 120a, 120b, 120c generally include a first workstation 106a, 106b, 106c communicably coupled to a first data storage device 110. Open network 102 also includes a first data routing device 116 communicably coupled to first workstation 106 and first data storage device 110. Additionally, closed network 104 portion of nodes 120a, 120b, 120c generally include a second workstation 108 communicably coupled to a second data storage device 112. Closed network 104 also includes a second data routing device 118 communicably coupled to second workstation 108 and second data storage device 112.

Nodes 120, including workstations 106, 108 within dual network computing system 100 are illustratively connected to a distributed communication network and each node 120 includes local processing capability and memory. As further detailed herein, each workstation 106, 108 illustratively includes at least one processor and at least one memory that is accessible by the processor. The communication network illustratively includes any suitable computer networking protocol, such as an internet protocol (IP) format including Transmission Control Protocol/Internet Protocol (TCP/IP) or User Datagram Protocol (UDP), an Ethernet network, a serial network, or other local or wide area network (LAN or WAN), for example.

Dual network computing system 100 is a complete dual network wherein open network 102 and closed network 104 are two physically separate computing environments. Stated another way, other than the single user residing at node 120, data accessed and viewed by users in open network 102 may not also be accessed or viewed by users in closed network 104, except that a special purpose data transport device, namely data transport server 114, may facilitate the controlled transport of digital or electronic data from open network 102 to closed network 104. In essence, the present disclosure provides a complete dual network environment in which two physically separate computing networks, open network 102 and closed network 104, are supported and exist with the user residing at node 120 as the logical connection. Data transport server 114 is a special purpose one-way hardware transport server that is configured to allow the uni-directional flow of data, for example, from a sending machine (e.g. first workstation 106) within open network 102 to a destination machine (e.g. second workstation 108) within closed network 104. Data transport server 114 is described in further detail in the illustrative embodiment of FIG. 4.

In the illustrative embodiment of FIG. 1, first workstation 106 includes a first personal computer (PC1) 122 communicably coupled to a first monitor/display device (Monitor1) 126. First display device (Monitor1) 126 is operative to visually display data accessible by first personal computer 122. Exemplary first personal computers 122 illustratively include a processor 123 and a memory 125. First personal computer 122 may include various commercially available computing devices such as HP Chrome box and Asus Chrome box, wherein the exemplary personal computers are configured to have internet connectivity via a network interface card.

First workstation 106 illustratively further includes keyboard video mouse (KVM) switch 130, keyboard 134, mouse 132, and authentication device 136. KVM switch 130 facilitates the connection of keyboard 134 and mouse 132 to two or more personal computers and two or more display devices. For example, in dual network computing system 100, KVM switch 130 allows a single user residing at node 120 to have a common method for inputting keyboard and mouse functions to two or more personal computers, namely first personal computer 122 and second personal computer 124. The inputs provided via KVM switch 130 to the personal computers 122, 124 are then displayed via display devices 126, 128 which are communicably coupled to the personal computers 122, 124.

Dual network computing system 100 provides complete transparency to the user. System 100 therefore combines computing systems within open network 102 and closed network 104 in such a manner that, to the user, it is as if they were using a single system with open Internet access (or as close as practicable to that). In one embodiment, dual network computing system 100 may accomplish combining the two computing systems, for example, by enclosing processor 123 of PC1 122 and processor 127 of PC2 124 into a single computer box or housing. Additionally, as noted above, KVM switch 130 will automatically switch the user from one computing system (personal computer 122) to the other computing system (personal computer 124) by the user merely moving the pointer corresponding to mouse 132 to the edge of display device 126 adjacent to personal computer's 124 display device 128. Thus, by moving mouse 132 between adjacent display devices 126, 128 it appears to the user that first workstation 106 and second workstation 108 are functioning as one system with two display devices wherein display device 126 displays the open Internet environment and display device 128 displays the closed development environment.

Authentication device 136 may be, for example, a card reader device configured to authenticate the network access credentials associated with a single user residing at node 120. In one embodiment of the present disclosure, a common access card (CAC) 138 may include network access credentials encoded on a computer chip integrated within CAC 138. Moreover, in this illustrative embodiment, authentication device 136 may include a card input slot which receives CAC 138, wherein authentication device 136 is configured to scan the computer chip integrated within CAC 138 for the user's network access credentials and prompt the user to enter a personal identification number (PIN) in order to complete the authentication process and gain access to open network 102. Additionally, in one aspect of this embodiment, completion of a single authentication event enables a user at node 120 to gain access to open network 102 and the closed network 104. In yet another aspect of this embodiment, a separate authentication event is needed to gain access to closed network 104, wherein a second authentication device 136 (not shown) receives a second CAC 138 (not shown) that is uniquely configured to only allow access to closed network 104 and thus may be used only within the closed network portion of dual network computing system 100. Second CAC 138 may further include network access credentials and second authentication device 136 may be configured to scan second CAC 138 and prompt the user to enter a PIN number in order to complete the authentication process and gain access to closed network 104. While authentication device 136 is described as a card reader device, alternative exemplary authentication devices may include various other devices that provide multiple-factor authentication such as biometric scanning devices or network access tokens.

Referring again to FIG. 1, second workstation 108 illustratively includes substantially the same components as first workstation 106 except that second workstation 108 includes a second personal computer (PC2) 124 communicably coupled to a second monitor/display device (Monitor2) 128. Second display device (Monitor2) 128 is operative to display data accessible by second personal computer 124. Exemplary second personal computers 124 illustratively include a processor 127 and a memory 129. The second personal computers 124 may include various commercially available standard desktop computing devices such as Dell desktop computers having a hard disk including an operating system (OS) partition and a local data storage partition wherein the OS partition includes or is configured to run one or more of a plurality of operating systems such as Windows, LINUX, UNIX, or MAC OSX. In one embodiment of the present disclosure, second personal computer 124 is a virtual machine host that may be dynamically altered to include a desired OS environment (Windows, LINUX, UNIX or MAC OSX) wherein the desired OS environment may be configured to allow a user at second workstation 108 to engage in various research, developmental and testing activities.

In one aspect of this embodiment, exemplary second personal computers 124 may further include various commercially available computing devices such as the Intel Nook and Apple Mac Mini. As described above, KVM switch 130 facilitates the connection of keyboard 134, mouse 132, and authentication device 136 between first workstation 106 and second workstation 108 such that keyboard 134 and mouse 132 are shared by the two workstations. For example, in one embodiment of the present disclosure, KVM switch 130 allows a single user residing at node 120 to have a common method for inputting keyboard and mouse functions to first personal computer 122 and second personal computer 124. In one aspect of this embodiment, inputs provided to first personal computer 122 via keyboard 134 and mouse 132 are displayed via first display device 126 and inputs provided to second personal computer 124 via keyboard 134 and mouse 132 are displayed via second display device 128. As described above, by moving mouse 132 between adjacent display devices 126, 128 it appears to the user that workstation 106 and workstation 108 are functioning as one system with two display devices wherein display device 126 displays the open Internet environment and display device 128 displays the closed development environment.

Figure 2:
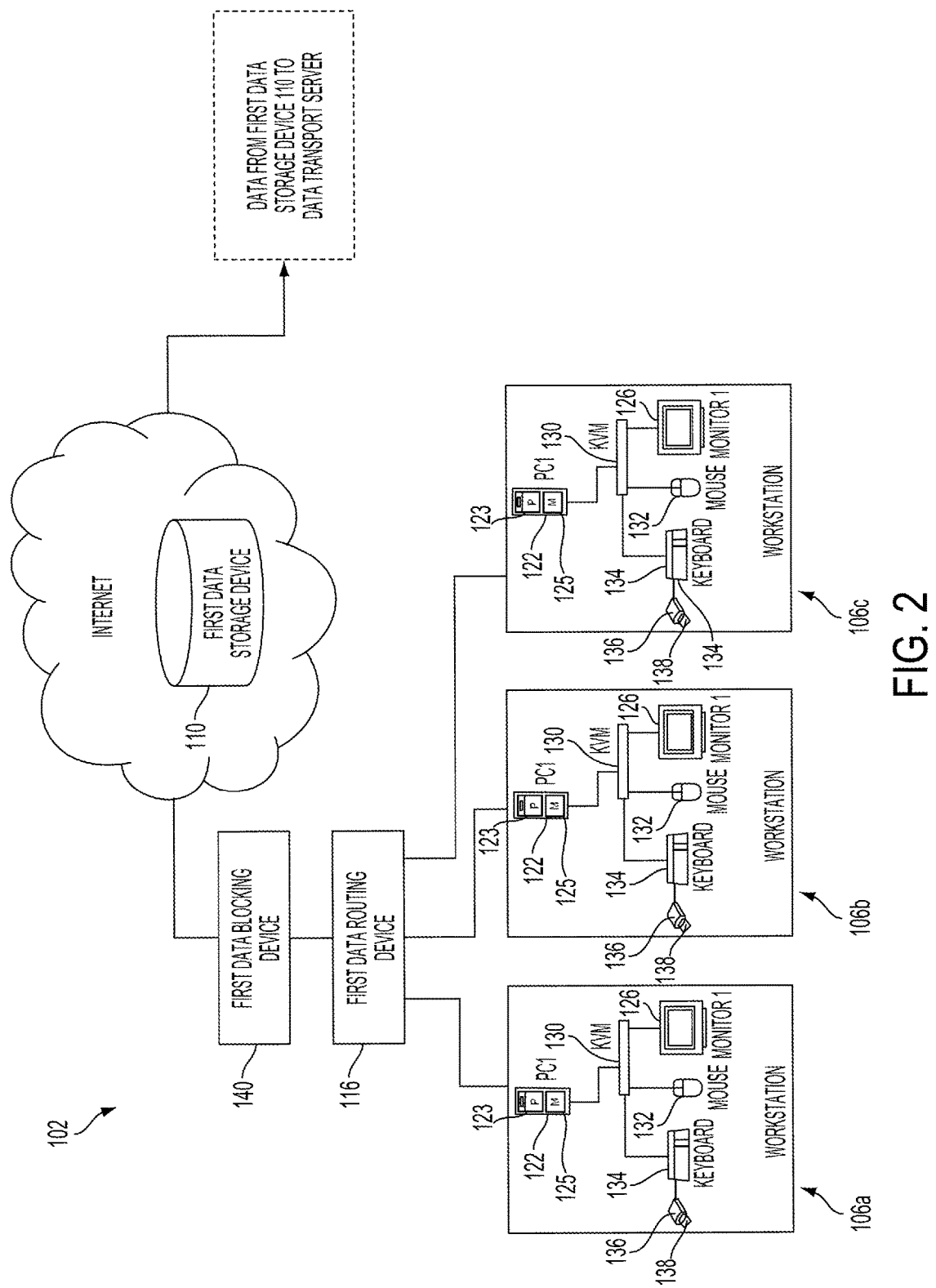
FIG. 2 is a schematic view of an illustrative network architecture of an open network according to the present disclosure.

Referring now to FIG. 2, open network 102 of nodes 120 are illustrated as including first workstation 106 (but not second workstation 108). Open network 102 further includes first data routing device 116 and first data storage device 110. First data routing device 116 is communicably coupled to first workstation 106 and communicably coupled to the first data storage device 110. First data routing device 116 enables data communications between first workstation 106 and first data storage device 110. Exemplary data routing devices include, for example, device routers and switches configured to facilitate bi-directional data communications between one or more devices within a Local Area Network (LAN) and one or more LANs within a larger computing network topology. For example, in conventional computer networks routers are essentially computers optimized for handling data packets and are generally configured to enable data packet transfer from a sending machine to a destination machine, wherein the sending and destination machines typically reside within separate computer networks.

In the illustrative embodiment of FIG. 2, first data routing device 116 may be a black side router configured to have reduced security features. For example, black side or first data routing device 116 lacks enhanced security functions such as built-in intrusion detection, out-bound data packet encryption, or in-bound data packet authentication. According to the illustrative embodiment, open network 102 may further include a first data blocking device 140 communicably coupled to the first data routing device 116, wherein first data blocking device 140 is configured to block data packets or other data traffic from entering and/or exiting open network 102. Exemplary data blocking devices include, for example, hardware and/or software based firewall devices configured to block unwanted data packets from entering open network 102 as well as restrict various Internet based services or destination machines that users within open network 102 can access or engage in data communications with. In one embodiment, first data blocking device 140 is a standard firewall/anti-intrusion hardware designed to protect individual computing clusters when they are physically remote from each other and using the Internet as a transport medium. As indicated above, first data routing device 116 is communicably coupled to the first data storage device 110. Exemplary data storage devices 110 include, for example, internet or server based data storage systems operative within a cloud based IT infrastructure and configured to communicate with a plurality of users.

As described above, with regard to illustrative open network 102, first workstation 106 includes first personal computer 122 communicably coupled to first display device 126 wherein first display device 126 is operative to display data accessible by first personal computer 122. In the traditional client server architecture, multiple servers and client workstations are resident on the network with gateways to the Internet connected to one another and the Internet via routers and bridges. In the illustrative embodiment of FIG. 2, first personal computer 122 may be any one of the Chrome devices mentioned above, wherein the Chrome device may be configured to include the standard Chrome box operating environment. The Chrome box operating environment primarily supports cloud based applications and Internet browsing thereby relying heavily on an Internet connection for software functionality and data storage. More particularly, in one aspect of the illustrative embodiment, the Chrome box operating environment may include functionality wherein data accessed by a user at first personal computer 122 may be stored in, for example, a commercially hosted data storage device such as a cloud based data storage account. In another aspect of this embodiment, the data may be stored in a commercially hosted cloud based data storage system uniquely configured for use by, for example, private corporations, academic institutions, intelligence agencies or Department of Defense (DoD) personnel.

With further reference to FIGS. 1 and 2, because data storage within the Chrome box operating environment is primarily cloud based and because data accessed by first personal computer 122 is physically and logically isolated from a closed intranet environment, i.e. closed network 104 (i.e. second workstation does not have direct access to the first storage device), there is minimal need for enhanced network security features within the black side or open network 102. The black side network concept is described in more detail in the illustrative embodiment of FIG. 4.

For users residing at first workstation 106, e.g. scientists and engineers, open network 102 offers fast and unfettered access to the internet to conduct research and to otherwise engage in data communications with the greater scientific community including social interactions such as forums, chat rooms, social media, etc. With regard to open network 102 and first personal computer 122, due to the cloud based functionality of various software programs and file storage systems, commercial providers of application and data storage services, e.g. Google™, are responsible for maintaining the application and internet security within the operating environment utilized by users within open network 102. In one embodiment, network security of open network 102 may be maintained by a third party with a vested interest in ensuring a high degree of security against network attacks, viruses and malware to minimize the cost and potential threat to the closed network system. For example, use of Google Chrome's operating system and hardware within open network 102 provides a sufficient degree of network security thereby by improving the design of dual network computing system 100. Because Google's system is a cloud based system and ensuring data and network integrity is vital to Google's ability to market its system, the cost of ensuring a secure open environment is shifted to Google and lifted from the private and public entities who seek to practice the system described in the present disclosure. In another embodiment, other operating systems having functionality and network security equivalent to that of Google Chrome may also be utilized, however currently Google likely provides desired systems at the lowest cost. For example, the cost for a Chrome workstation to connect to the Internet in open network 102 is currently less than $300 per workstation.

If the black side operating environment is somehow compromised by the presence of, for example, malware applications or malicious software/code, the red side closed network 104 environment will be unharmed due to the physical and logical isolation between open network 102 and closed network 104 (i.e. first workstation does not have direct access to the second storage device). The commercial provider of the application and data storage services thus incurs the primary responsibility for maintaining overall system security of the cloud based infrastructure, and so the users and consumers of the cloud based services are absolved of any large scale system security responsibilities.

In one illustrative embodiment of the present disclosure, open network 102 and closed network 104 may be comprised of a plurality of interconnected workstations that cooperate to form one or more Local Area Networks (LANs). The LANs formed by the interconnected workstations of open network 102 may be further segmented into Virtual LANs (VLANs) to provide flexible compartmentalization across a number of different LAN segments. Alternatively, in one aspect of this embodiment the VLAN segments may further span across sites to form Communities of Interest (COIs) and connections between the LANs to other external sites in order to form a Wide Area Network (WAN) maybe hardware encrypted.

Figure 3:
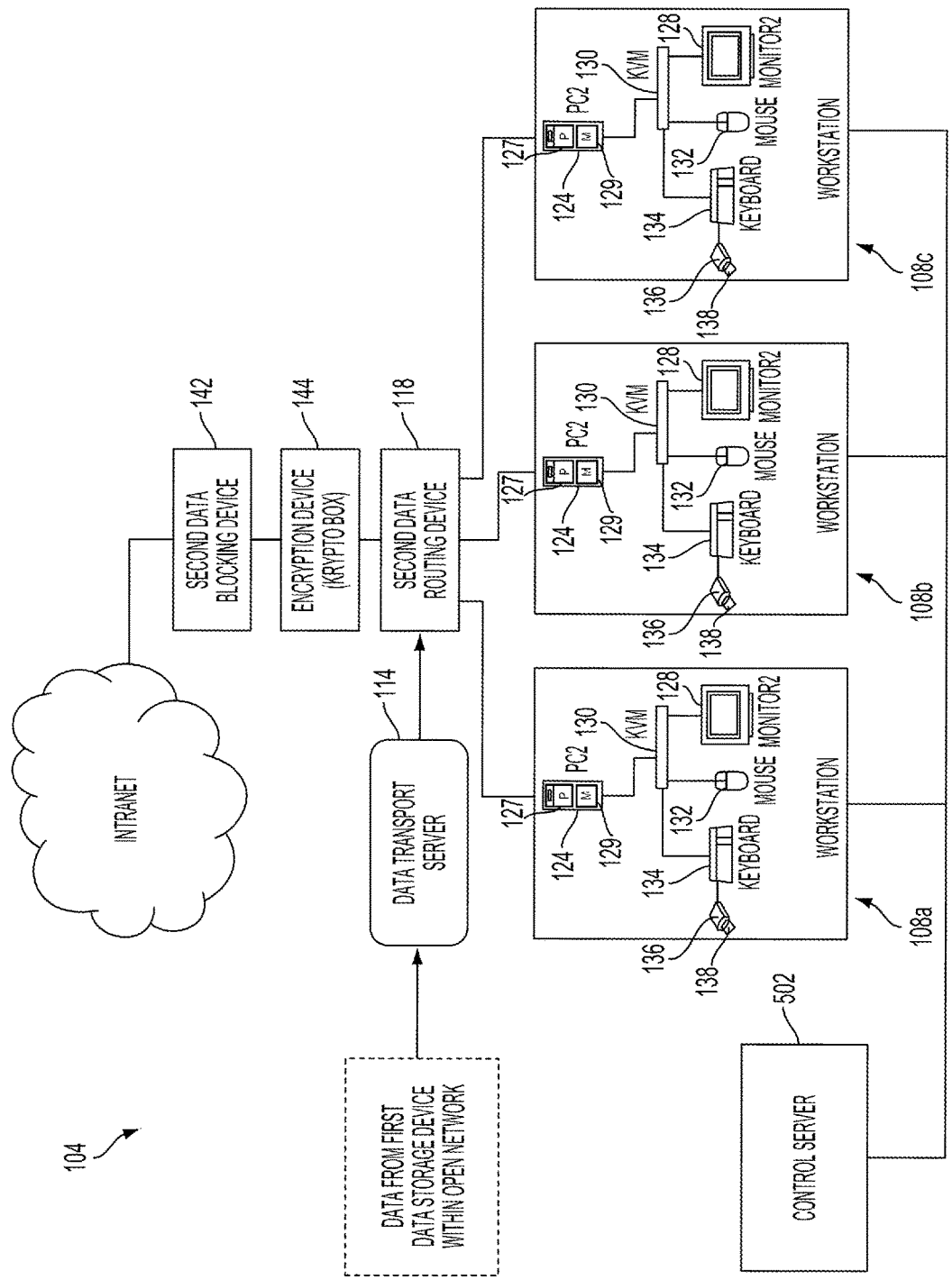
FIG. 3 is a schematic view of an illustrative network architecture of a closed network according to the present disclosure.

Referring now to FIG. 3, closed network 104 portions of nodes 120 are illustrated as including second workstation 108 but not first workstation 106 (i.e. second workstation does not have direct access to the first storage device). Closed network 104 further includes second data routing device 118 and second data storage device 112. Second data routing device 118 is communicably coupled to second workstation 108 and communicably coupled to second data storage device 112. Second data routing device 118 enables data communications between second workstation 108 and second data storage device 112. As described above, exemplary data routing devices include routers and switches configured to facilitate bi-directional data communications between one or more devices within a LAN and one or more local area networks within a larger computing network topology.

In the illustrative embodiment of FIG. 3, second data routing device 118 may be a red side router configured to have enhanced security features wherein red side or second data routing device 118 includes, for example, security functions such as built-in intrusion detection, out-bound data packet encryption, and in-bound data packet authentication. In one aspect of this embodiment, second data routing device 118 may be configured to have enhanced data confidentiality by encrypting a senders data packets before transmitting them across closed network 104. Likewise, second data routing device 118 in combination with other devices in closed network 104, may be configured to performed data origin authentication by authenticating the source of data packets received from specific senders and ensuring that the data has not been altered during transmission.

According to the illustrative embodiment, closed network 104 may further include a second data blocking device 142 communicably coupled to the second data routing device 118 wherein second data blocking device 142 is configured to block data packets or other data traffic from entering and/or exiting closed network 104. Exemplary data blocking devices include, for example, hardware and software based firewall devices configured to block unwanted data packets from entering closed network 104 as well as restrict or entirely block internet based services or destination machines that users within closed network 104 can access or engage in data communications with. Closed network 104 may further include encryption device 144 disposed intermediate second data routing device 118 and second data blocking device 142, wherein encryption device 144 is communicably coupled to second data routing device 118 and second data blocking device 142. Encryption device 144 may be an electronic encryption device or communications security (COMSEC) module used in conjunction with digital computer networks to ensure secure transmission of digital data through point-to-point encryption. Exemplary encryption devices include, for example, KIV-7 which is a compact miniaturized embeddable version of the American military KG-84 encryption device developed in the mid- 1990s by AlliedSignal Corporation (USA) to meet the growing demand for secure data communication links.

In one embodiment, closed network 104 may forgo the use of encryption device 144. In various illustrative embodiments, use of encryption device 144 may depend on whether a group of workstations such as workstations 108*a*, 108*b*, and 108*c* are physically located in one location or spread across multiple locations. For example, if closed network 104 only existed at a single location with no connection to other remote computing locations, such as might occur in a local development work group, then there is no need for encryption device 144 because the local work group does not communicate outside of the local enclave. On the other hand, if the local enclave were part of a larger wide area enclave that included one or more physically separate computing locations, then encryption device 144 may be used to encrypt data transmitted between each computing location within the wide area enclave to protect data within closed network 104. Thus, encryption device 144 may be considered a configuration dependent device designed and utilized when necessary to isolate closed network 104 from the Internet when the Internet is used as a transport vehicle to connect one or more remotely located enclaves.

As indicated above, closed network 104 illustratively implements increased security measures as compared to the reduced or minimal security in open network 102. The security measures of closed network 104 may include security technologies that restrict or block communication with devices and services external to closed network 104, such as internet services, web services, external data transfer, external email services, etc (i.e. second workstation does not have direct access to the first storage device and first workstation does not have direct access to the second storage device). Such security technologies may serve to reduce the likelihood of security threats such as, for example, viruses, worms, denial of service, eavesdropping, exploits, malware, rootkits, keyloggers, unauthorized user access or modification, cybercrime, cyber warfare/information warfare, unauthorized execution of code/applications/services/system shutdown and reboot, active and passive network attacks, and other security threats. Open network 102, on the other hand, allows access by computer devices to one or more external devices and services such as the internet services, web services, external data transfer, external email services, etc. In the illustrative embodiment of FIG. 1, open network 102 implements fewer security measures than closed network 104. In one embodiment, closed network 104 may be a classified network, and open network 102 may be an unclassified network. Other types of open and closed networks may be provided in alternative embodiments of the present disclosure.

With regard to FIGS. 1 and 3, as described above, second workstation 108 illustratively includes second personal computer 124 communicably coupled to second display device 128, wherein second display device 128 is operative to display data accessible by second personal computer 124. Exemplary second personal computer 124 include various commercially available standard desktop computing devices such as Dell desktop computers including a hard disk partitioned to include an operating system (OS) partition and a local data storage partition wherein the OS partition includes or is configured to run one or more of a plurality of operating systems such as Windows, LINUX, UNIX, or MAC OSX. In one illustrative embodiment of the present disclosure, second personal computer 124 is a virtual machine host that may be dynamically altered to include a desired OS environment (Windows, LINUX, UNIX or MAC OSX). While the operating system partition of second personal computer 124 is configured to host a customized virtual hosting environment, a local data storage partition will also be available for use by the virtual machine environment to store and run various software programs/applications such as, for example, software development and modeling programs, circuit design and simulation programs, and mechanical design and CAD drawing programs.

Referring further to FIG. 3, second data blocking device 142, encryption device 144 and second data routing device 118 are illustratively configured such that closed network 104 is a local or restricted intranet communications network and therefore lacks any connection through gateway nodes/computers to the internet environment external to closed network 104. Because closed network 104 lacks internet access, users performing various work related tasks within the closed network can do so in a far less restrictive computing environment.

In one illustrative embodiment of the present disclosure, second data blocking device 142, encryption device 144 and second data routing device 118 are configured to enable encrypted isolation between nodes external to closed network 104 and VLANS within closed network 104. This encrypted isolation therefore significantly minimizes any risk of compromising or degrading the integrity of high value or classified data residing within, for example, second data storage device 112 of closed network 104. Moreover, in one aspect of this embodiment, closed network 104 may be further configured such that all user data storage occurs within a cloud based system wherein second data storage device 112 may be an internal file server that stores data managed, modified, or shared by one or more users within closed network 104. Third party applications such as, for example, Symantec File Share Encryption enable "data at rest" encryption and thus allows users to encrypt data resident on an internal file server or second data storage device 112. Furthermore, as indicated above with regard to FIG. 2, other exemplary data storage devices include, for example, server based data storage systems operative within a cloud based IT infrastructure configured to communicate with a plurality of users each having individual user accounts within the cloud based data storage system.

In the illustrative embodiment of FIG. 3, the red side or closed network 104 is where the user performs a variety of work related tasks that may be of a sensitive, highly confidential, or classified nature and thus data associated with those tasks may need to be handled within a computer network having heightened network security protocols. With regard to closed network 104, the foremost protection is the fact that closed network 104 is physically isolated from external nodes and gateways within the Internet environment of open network 102. Thus, persons such as hackers wishing to penetrate closed network 104 to obtain sensitive or classified data, exploit network security vulnerabilities, or introduce malicious code will be significantly hampered by the lack of access points and data transport mechanisms.

Within dual network computing system 100, there are a variety of ways to configure communications links to provide a means for connecting one or more LANs to one another via an encrypted link. Irrespective of the type of configuration used, the encrypted link should comply with the minimum encryption standard defined by Federal Information Processing Standard (FIPS) 140-2 which articulates security requirements suitable for encrypted data classified up to SECRET. These encrypted links thus provide isolation and protection in the event of a software defect or problem that may arise while users within closed network 104 are testing, for example, developmental software modules. Because the external links that connect LANS into the WLAN pass through the internet, the encrypted links isolate the WLAN from the internet and may be thought of logically as point-to-point encryption.

Figure 5:
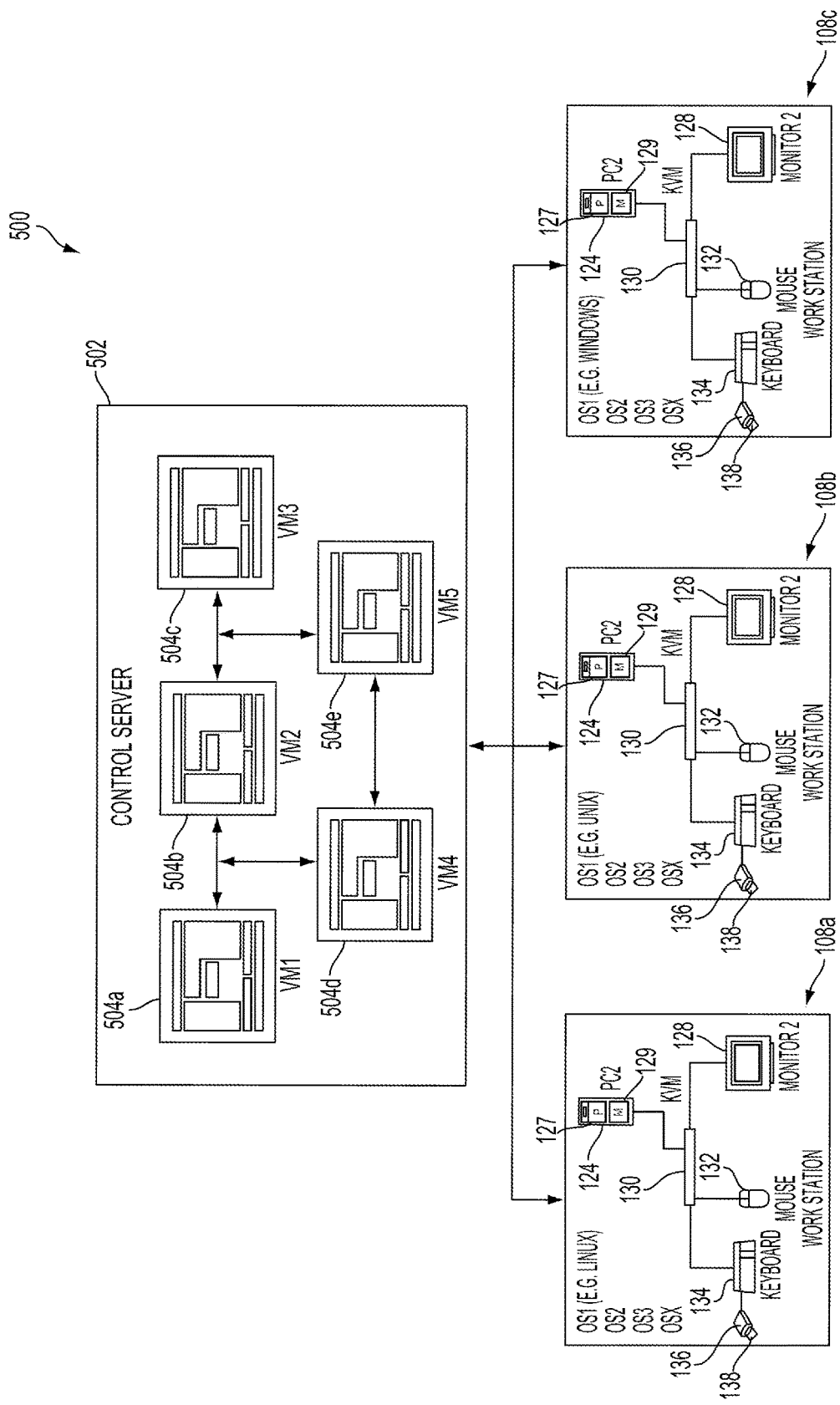
FIG. 5 is a block diagram illustrative of an illustrative cloud computing system of the dual network computing system of FIG. 1.

Additionally, as is described in the illustrative embodiment of FIG. 5, the use of a virtual machine environment and the lack of a single standard OS within every second personal computer 124 of closed network 104 further enhance the network security posture of closed network 104 and therefore make it difficult to compromise or infect multiple red side devices. For example, in the virtual machine environment, if a node is compromised by an insider threat, namely a user having internal access to closed network 104, it is unlikely that malicious code will migrate to multiple second personal computers 124 or other devices within closed network 104, because the malicious code would have to know how to operate in multiple OS environments and not just the initially infected OS environment. Likewise, the use of local VLANs that implement encrypted network isolation protocols helps to further isolate disruptions that might occur if newly developed software being tested were to somehow crash or render a computing system inoperable. Hence, if a particular system is compromised, the use of local VLANs with encrypted isolation helps to prevent spillage of infectious malicious code to other red side devices and thus minimizes the impact to other sub-networks within the red side network enclave. Accordingly, users such as engineers and scientists are free to write/install and run software being developed within closed network 104 without fear of risking an intrusion into the red side network environment or fear of compromising dual network computing system 100 by identifying a vulnerability that did not exist prior to testing and running certain developmental software.

Figure 4:
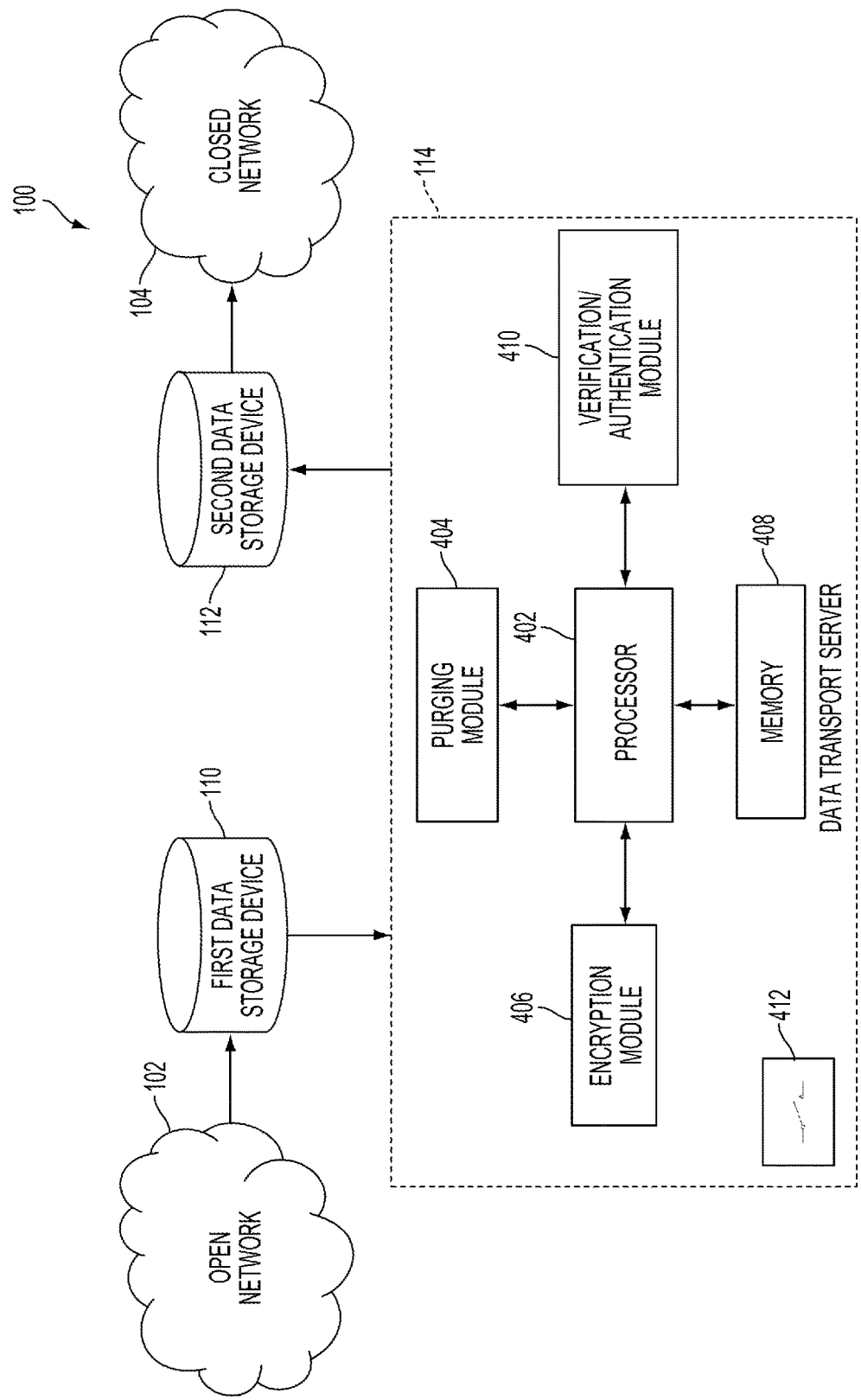
FIG. 4 is a block diagram illustrative of a data transport server of the dual network computing system according to the present disclosure.

FIG. 4 is a block diagram of an illustrative data transport server 114 of dual network computing system 100. While describing the illustrative embodiment of FIG. 4 reference will also be made to the various steps within the flow diagram depicted in the illustrative embodiment of FIG. 9 which provides an exemplary method of operation of dual network computing system 100. The present disclosure describes a network architecture by providing a dual network structure wherein only a first network (i.e., open network 102) is connected to the internet and a second network (i.e., closed network 104) is generally isolated from both the internet and the first network via data transport server 114. Data transport server 114 is a special purpose one-way hardware transport server that cooperates with other devices in dual network computing system 100 to isolate closed network 104 from not only the internet but also open network 102. Exemplary devices which include functionality similar to data transport server 114 may be generally known by one of ordinary skill in the art. One such device is a High Assurance Guard (HAG) which is a multilevel security computer device used to communicate between, for example, different DoD Security Domains, such as Non-Secure Internet Protocol Router Network (NIPRNet) to Secure Internet Protocol Router Network (SIPRNet). A HAG is one example of a computing and networking device configured to provide controlled data transfer interface between different security levels. Exemplary HAG devices include the Turnstile HAG manufactured by Rockwell Collins, Cedar Rapids, Iowa and the Radiant Mercury System manufactured by Lockheed Martin, Bethesda, Md.

Data transport server 114 is illustratively connected to a distributed communication network and includes local processing capability and memory. In particular, data transport server 114 includes at least one processor 402 and at least one memory 408 wherein the at least one memory 408 is accessible by processor 402. Additionally, memory 408 contains instructions that when executed by the at least one processor 402 cause the processor to command one or more modules within data transport server 114 to perform operations on data provided to first data storage device 110. Data transport server 114 cooperates with at least two special purpose client/user workstations, namely first workstation 106 and second workstation 108, wherein each workstation is comprised of two independent special purpose CPU Boxes, namely PC1 122 and PC2 124. In the illustrative embodiment of the present disclosure and as indicated above, dual network computing system 100 comprises two physically separate environments wherein the internet or open network 102 environment may be labeled the black side, and the intranet or closed network 104 environment may be labeled the red side. In one aspect of this illustrative embodiment, dual network computing system 100 may further comprise encrypted WAN links and other network security equipment wherein the links and additional equipment may be labeled the grey side.

Illustratively, data transport server 114 is a computing device that provides one-way or unidirectional data transport from, for example, the internet environment of open network 102 to the intranet environment of closed network 104. Data transport server 114 may include a hardware configuration that causes data transport server 114 to be electrically restricted to one-way transport wherein data may only be transported from open network 102 to closed network 104. In various embodiments, data transport server 114 includes a logical and physical unidirectional connection and utilizes data transmission protocols that include data error correction such as, for example, cyclical redundancy check (CRC) and checksum error correction methodology. In one embodiment of the present disclosure, data transport server's 114 one-way transport functionality is implemented entirely by the data transport server's internal hardware configuration and not by any particular software or firmware programing. For example, in one embodiment, data transport server 114 may include a first network communications card providing a physical one-way interface/data link to the black side and a second network communication card providing a standard one-way communications interface to the red side. In another embodiment, data transport server 114 may include a connectivity switch 412 having a closed position and an open position. In one aspect of this embodiment connectivity switch 412 in the closed position provides electrical communication from open network 102 to closed network 104 such that data from first data storage device 110 on open network 102 can be transported to second data storage device 112 on closed network 104. Likewise, when connectivity switch 412 is in the open position electrical communication between open network 102 and closed network 104 is prevented. Thus, when connectivity switch 412 is in the open position, data from first data storage device 110 on open network 102 cannot be transported to second data storage device 112 on closed network 104. In a variant of this aspect, connectivity switch 412 is a mechanical switch that moves between the opened and closed position in response to a user toggling connectivity switch 412. In yet another embodiment, data transport server's 114 one-way transport functionality may be implemented by one or more software or firmware programs uniquely coded to permit unidirectional data flow from open network 102 to closed network 104. For example, data transport server's 114

TCP/IP stack may be modified to remove the out-bound data functions for certain transmission ports that are used for transmitting data from closed network 104.

Referring again to FIG. 4, data transport server 114 facilitates the unidirectional transport of files or data from first data storage device 110 within open network 102 to second data storage device 112 within closed network 104. More particularly, data transport server 114 receives data from, for example, the black side internet cloud data storage user account (e.g. first data storage device 110), configures or prepares the data/files for transport to closed network 104, and then transports the data to the red side intranet cloud data storage user account (e.g. second data storage device 112). In one embodiment of the present disclosure data transport server 114 may include one or more software programs configured to receive, for example, an incoming data file to be scrubbed or purged of undesired code elements along with the data file's database attributes which allow the data file to be stored in an exemplary mirrored data storage location on a red side cloud or storage device such as second data storage device. Other than preparing files for transport and receipt by second data storage device 112, data transport server 114 cannot send data or files out to the internet nor can data transport server 114 send data to any communication nodes or gateways external to closed network 104. Data transport server 114 is thus devoid of outbound data transport capabilities.

In one embodiment, data transport server 114 provides one-way data synchronization and is configured to mirror the data and structure created in a first encrypted/protected cloud based black side data storage account to a second encrypted/protected cloud based red side data storage account. Accordingly, when a user modifies or creates a folder within the first black side data storage account, a corresponding mirrored new folder or modification to an existing folder may also occur within the second red side data storage account. As discussed in more detail below, in one embodiment, when a data file is placed in a folder in the black side storage account it may be transported to the red side storage account and while being transported the data file may be purged of any undesirable data elements or purged of data elements configured to at least one of degrade functionality of the dual network computing system, perform data extrusion, or exfiltrate data from the dual network computing system. Data exfiltration and/or data extrusion are concepts commonly known in the art of computing systems, computer networking and IT network architecture design. An example definition of data exfiltration and/or data extrusion includes the unauthorized transfer of sensitive information from a target's computer network to a location which a threat actor controls. In one embodiment, an exception can be made or allowed for digitally signed data files and/or binary files that can be authenticated, by data transport server 114, to be from a known and trusted source. Hence, data transport server 114 may include logic that overrides a purging function of an exemplary purging module when data transport server 114 verifies at least one authentication factor associated with one or more data and/or binary files to determine whether that the files originated from a trusted source.

In various embodiments of the present disclosure, data transport server is an element of dual network computing system 100 whose functions comprise: 1) preventing the introduction of malware or malicious code into an exemplary development system by way of data transport server's 114 purging and/or scanning modules; 2) preventing the exfiltration of data from an exemplary development system; 3) providing a user with the results of their research for use in an exemplary development environment in an easy to use and safe manner; 4) maintaining and mirroring database structures between the black side data storage account and the red side data storage account; and 5) authenticating the validity of data and/or binary files that are permitted to be transported from the black side storage account to the red side storage account.

According to the illustrative embodiment of FIG. 4, in addition to processor 402 and memory 408, data transport server 114 further includes a purging module 404, an encryption module 406 and a verification module 410 wherein each module may be configured for data communication with first data storage device 10. In one aspect of the illustrative embodiment, processor 402 and purging module 404 may be communicably coupled to first data storage device 110 by way of a first data link adapted to enable unidirectional data communication from data transport server 114 to first data storage device 110. Hence, as shown in the step 906 and step 908 of FIG. 9, when processor 402 detects data has been provided to first data storage device 110, processor 402 may then command purging module 404 to scan the data in order to identify one or more executable data elements. In one embodiment executable data elements comprise data or files having any one of a plurality of executable file extensions/types including, for example, EXE, APP, INS, IPA, PIF, RUN, VB, VBS, VBE, WS and WSF. In another aspect of the illustrative embodiment, purging module 404 may include scrubbing software that reduces, for example, a Microsoft Word document to a pure text file/document and strips, removes, or purges formatting and scripting information which may be embedded within the Microsoft Word file. With regard to other exemplary documents or files, purging module 404 may verify that the file contains only ASCII text and does not contain, for example, executable code (i.e. compiled binaries). In yet another aspect of this embodiment, data transport server 114 may be configured to allow signed binary files to be transported from open network 102 to closed network 104. As is customary in the art, frequently developers may obtain a compiled snippet or sub-routine that they wish to incorporate into code or a software program being developed within closed network 104. Thus, as described below, data transport server 114 may be configured to allow the compiled sub-routine to be transported to closed network 104 so long as the sub-routine or binary file was signed and authenticated by a trusted authority. For example, companies such as Google or Microsoft may be willing to provide a module in binary form for use by a software developer. If, for example, module was signed and authenticated by Microsoft or Google then the module would be allowed across the data boundary between the black side 102 and red side 104. In one embodiment, dual network computing system 100 further includes a first plurality of distinct data elements in a machine readable stream and a second plurality of distinct data elements in a machine readable stream, wherein the first plurality of distinct data elements includes data provided to first storage device 110 and the second plurality of distinct data elements includes remaining data elements that are transported to second storage device 112 by data transport server 114.

In yet another aspect of the illustrative embodiment, purging module 404 may further scan the provided data in order to identify one or more computer virus data elements, one or more malicious code data elements, or one or more elements of data or code configured to cause undesired effects to dual network computing system 100. As shown in step 910 of FIG. 9, if the data provided to first data storage device 110 includes any one of the aforementioned executable file extensions, computer virus data elements, malicious code element, or any code configured to cause undesired effects to a computing network, then purging module 404 will initiate a purging algorithm to purge or remove certain unwanted elements from the data. Once all undesired elements have been purged/removed from the provided data, processor 402 may command other modules within data transport server 114 to perform additional operations on the data provided to first data storage device 110. In the illustrative embodiment of FIG. 9, step 914 indicates that processor 402 of data transport server 114 may cause, for example, authentication module 410 to execute a data verification algorithm to determine whether the data provided to the first data storage device 110 originated from a trusted source. If other modules are not commanded to perform additional operations on the data provided, data transport server 114 will then transport the remaining data elements (less the purged/undesired data elements) to second data storage device 112. In a variant of this aspect, data transport server 114 transports the remaining data elements by way of a second data link adapted to enable unidirectional data communication from data transport server 114 to second data storage device 112. In yet another aspect, data transport server 114 may be configured to automatically detect data provided to first data storage device 110, and in response to automatically detecting, automatically executing the purging algorithm to purge the provided data of undesired code elements.

Referring again to the illustrative embodiment of FIG. 4, processor 402 and verification module 410 may be communicably coupled to first data storage device 110 such that when processor 402 detects data has been provided to first data storage device 110, processor 402 may then command verification/authentication module 410 to initiate an algorithm to verify or authenticate that the data provided to first data storage device 110 originated from a trusted source. As discussed above, at step 914 of FIG. 9 the algorithm may cause verification/authentication module 410 to verify or authenticate the data by, for example, analyzing and verifying at least one authentication factor associated with the data and comparing the analyzed authentication factor to a list of known authentication factors to determine whether the source of the data is in fact a trusted source. In one aspect of the illustrative embodiment, the at least one authentication factor may include a digital signature associated with the provided data. In another aspect of the illustrative embodiment, verification/authentication module 410 may also verify the checksum in a file header of a document/file to determine whether a particular document or file has been altered in a manner not desired by the sender of the file.

Data transport server 114 may be configured to deny transport of unverifiable or unauthenticated data provided to first data storage device 110. As shown in step 918B of FIG. 9, data transport server 114 may be further configured to automatically delete unverifiable or unauthenticated data provided to first data storage device 110. Alternatively, in the disclosed illustrative embodiment of FIG. 9 if data provided to first data storage device 110 is purged of unwanted data elements or malicious code, at step 918A the remaining data elements may be transported to the closed network notwithstanding the new data failing the data authentication/verification check at step 916. Once the data provided to first data storage device 110 has been verified or authenticated, processor 402 may command other modules within data transport server 114 to perform additional operations on the data provided to first data storage device 110. If other modules are not commanded to perform additional operations on the data provided, data transport server 114 will then transport the verified or authenticated data to second data storage device 112. In one aspect of the illustrative embodiment of FIG. 4, data transport server 114 may be configured to automatically detect data provided to first data storage device 110, and in response to automatically detecting, automatically executing the verification/authentication algorithm to verify or authenticate the date provided to first data storage device 110.

Referring yet again to the illustrative embodiment of FIG. 4, processor 402 and encryption module 406 may be communicably coupled to first data storage device 110. When processor 402 detects data has been provided to first data storage device 110, as shown in step 920 of FIG. 9, processor 402 may command encryption module 406 to initiate an algorithm to encrypt the data provided to first data storage device 110. Encryption module 406 may encrypt the data by, for example, using an encryption algorithm based on Advanced Encryption Standard (AES) block cipher having parameters including a block length of 128-bits, a block length of 192-bits or a block length of 256-bit. In one aspect of the illustrative embodiment, data transport server 114 may be configured to automatically detect data provided to first data storage device 110, and in response to automatically detecting, automatically executing the encryption algorithm to encrypt the provided data. Once encryption module 406 encrypts the data provided to first data storage device 110, processor 402 may command other modules within data transport server 114 to perform additional operations on the data provided to first data storage device 110. As shown in step 922 of FIG. 9, if other modules are not commanded to perform additional operations on the provided data, data transport server 114 will then transport the encrypted data to second data storage device 112, wherein a decryption algorithm utilizing one or more decryption keys (not shown) may be used by second data storage device 112 to decrypt the data. In yet another aspect of the illustrative embodiment, the data provided to second data storage device may remain in an encrypted state until a user at second workstation 108 initiates a decryption algorithm to decrypt the data using one or more decryption keys accessible by PC2 124.

Referring further to the illustrative embodiment of FIG. 4, exemplary data or files that may be provided to first data storage device 110 include the plethora of electronic or digital downloadable information accessible via conventional internet searching methods. The data or files may include, for example, pictures, videos, movies, and typed or hand written documents accessible in digital or electronic format. The data or files may further include music, podcasts, audio books, documents, spreadsheet, PowerPoints and PDFs, wherein all data is accessible in an electronic or digital format and wherein users within open network 102 may wish to have access to some aspect of the information within closed network 104. Furthermore, as noted above, the data or files may be a software or code module in source or binary form or an entire software program, however the module or program may be restricted to text form prior to being transported or, if in source form, the module or program must be digital signed and authenticated as being from a trusted source to ensure that purging module 404 or authentication module 410 does not inadvertently purge or delete the data or files.

In one illustrative embodiment of the present disclosure, data provided to first data storage device 110 is limited to electronic or digital deposits provided to a user's data storage account wherein the data storage account exists within the framework of a commercially hosted data storage system including one or more cloud based data storage user accounts. Each user within dual network computing system 100 may have an open network user account (not shown) and a closed network user account (not shown) wherein data transport server 114 is communicably coupled to the open network user account and the closed network user account. Thus, data transport server 114 may be configured to monitor the data storage account of a user's open network account, detect the addition of data to the storage account of the user's open network account, perform a required operation on the data provided to the storage account of the user's open network account, and either remove/delete the data or transport the data to the storage account of the user's closed network account.

As indicated above, once provided or deposited to the data storage account of the user's open network account, the data would be kept in an encrypted state until delivered to the user's intranet or closed network account and a decryption algorithm is later used to decrypt the data. Once data provided to the user's open network account is properly transported and decrypted, the user may then, within closed network 104, transfer or move the data to a "public" intranet digital or electronic file folder such that other users within closed network 104 may view, use, modify and otherwise interact with the transported data.

FIG. 5 illustrates an exemplary cloud computing system 500 according to the present disclosure that resides within closed network 104 and is configured to deliver computing capacity as a service to users within closed network 104. Cloud computing system 500 illustratively includes a control server 502 operatively coupled to a cluster of nodes or virtual machines 504 (VMs). The virtual machines 504 are connected to a distributed communication network and each virtual machine 504 includes local processing capability and memory. In particular, each virtual machine 504 includes at least one processor (not shown) and at least one memory (not shown), wherein the at least one memory is accessible by the processor.

Illustrative control server 502 is a dedicated red side internal control server that may be configured to host and distribute on demand replacement virtual machines. In one embodiment of the present disclosure, one or more virtual machines 504 may be "pushed to" or accessed from a user's workstation such as second workstation 108. As such, virtual machine 504 can effectively replace a user's workstation operating system by providing the user with a desired operating system and programming environment. Therefore, control server 502 along with virtual machines 504, allows engineers and software developers to use a single physical workstation to develop programs within a particular operating environment that will be the target environment for the program being developed. Hence, the functionality provided by control server 502 along with virtual machine 504 streamlines engineering and software development since users are not required to change systems by moving to a new workstation each time a developer has a new project or wishes to develop a new program that runs in a different operating environment. Control server 502 may be configured to include a single location master copy of each virtual OS environment, thus control server 502 also streamlines the process for installing updates and patches for individual operating systems resident on PC2 124. In one embodiment, by providing a plurality of virtual machines, control server 502 ensures that a user will always start with a known state and condition within a particular operating system environment. Moreover, control server 502 provides assurance that particular operating environment is not contaminated with malicious code or damaged in anyway. Hence, control server 502 provides an important safeguard against inside threats, because in one aspect of the embodiment, virtual machine system data may be consistently refreshed and purged of any data (including malicious code) generated during a particular operating session when a new virtual machine environment is loaded. So, for example, an employee that leaves or is terminated cannot leave a particular machine or workstation with malicious code for a subsequent user since the malicious code is effectively scrubbed and purged by the loading of a new virtual machine 504. Control server 502 may be further configured such that software updates and patches are automatically delivered to each second personal computer 124 within closed network 104, wherein when a user reboots second personal computer 124, the OS partition within second personal computer 124 will consistently have the most updated and patched operating system.

As indicated above, exemplary second personal computer 124 includes various commercially available standard desktop computing devices such as Dell desktop computers having a hard disk including an operating system (OS) partition and a local data storage partition wherein the OS partition is configured to run one or more of a plurality of operating systems such as Windows, LINUX, UNIX, or MAC OSX. In the illustrative embodiment of FIG. 5, control server 502 may be configured to include a plurality of virtual machines 504 wherein each virtual machine 504 is configured to host at least one of a plurality of virtual computing environments wherein each computing environment includes at least one of a plurality of operating systems. Exemplary operating systems include, for example, Windows, LINUX, UNIX or MAC OSX. In one illustrative embodiment of the present disclosure, control server 502 communicates with one or more second personal computer 124 such that a desired OS environment may be configured for use by a user at second workstation 108, wherein second personal computer 124 is a virtual machine host that may be dynamically altered by control server 502 to include a desired OS environment.

Figure 6:
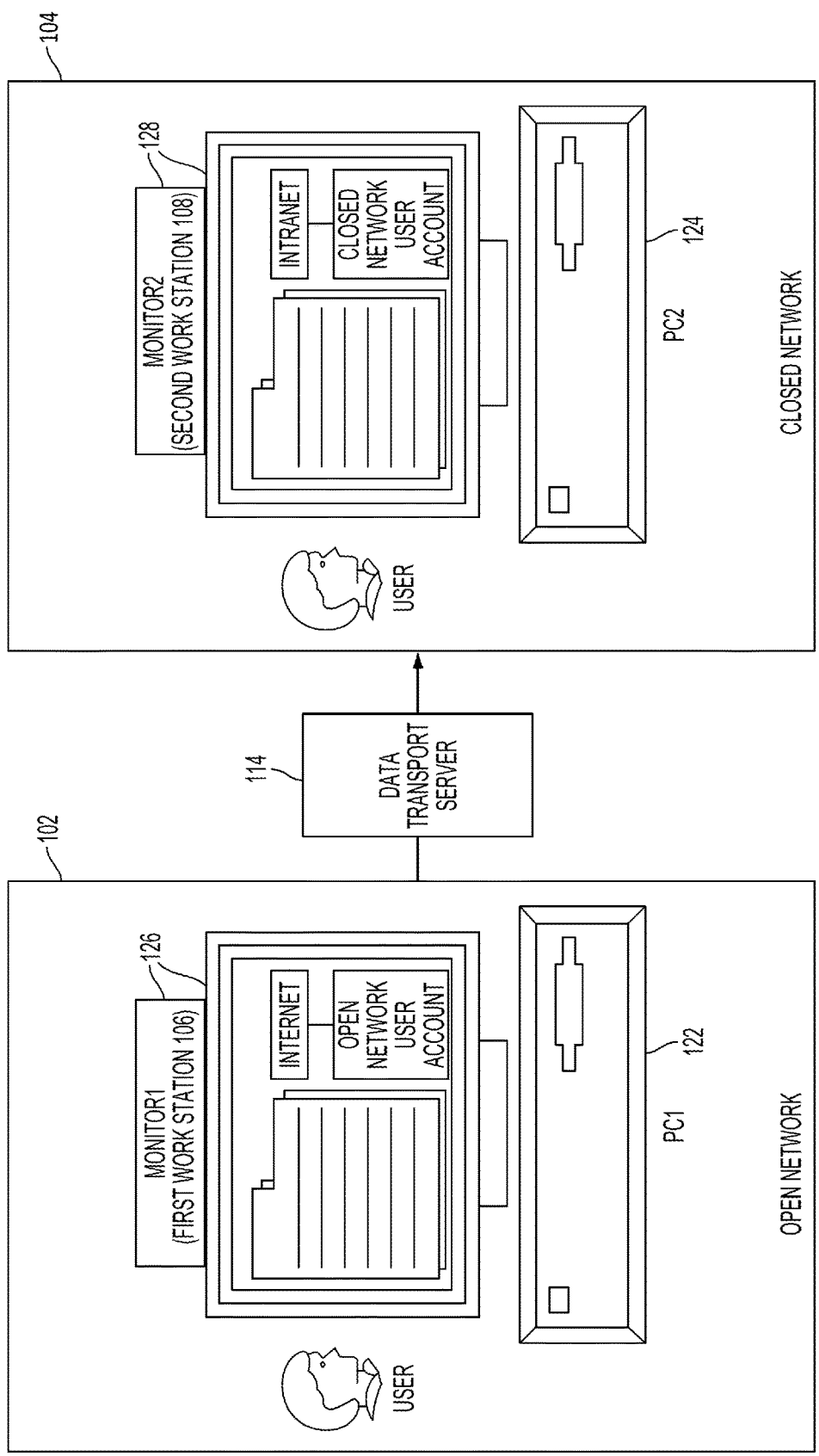
FIG. 6 illustrates a schematic diagram of the user view within the dual network computing system of FIG. 1.

FIG. 6 illustrates an exemplary schematic diagram of the user view within dual network computing system 100 according to the present disclosure. To the user, first workstation 106 and second workstation 108 may be configured to appear as a single workstation having at least two monitors or display screens, namely first display device 126 and second display device 128. As described above, first workstation 106 includes first personal computer 122 communicably coupled to first display device 126, wherein first display device 126 is operative to display data accessible by first personal computer 122. Second workstation 108 includes second personal computer 124 communicably coupled to second display device 128, wherein second display device 128 is operative to display data accessible by second personal computer 124. Because first personal computer 122 displays data accessible within the internet environment of open network, the user has relatively fast and unfettered access to the internet. Additionally, because data is being accessed from workstations within open network 102, conventional internet based data searches can be quickly performed such that the user can retrieve web pages and a wide variety of other digital or electronic data with minimal access or content restrictions.

When the user identifies data that the user wishes to transport to closed network 104, the user provides a digital or electronic copy of the data to first data storage device 110.

As described above, in one illustrative embodiment of the present disclosure, data provided to first data storage device 110 may correspond to data provided to a storage account of a user's open network user account wherein the storage account exists within the framework of a commercially hosted data storage system including one or more cloud based data storage user accounts. Likewise, data provided to second data storage device 112 may correspond to data provided to a storage account of a user's closed network user account wherein the storage account exists within the framework of a highly secure intranet data storage system including one or more cloud based data storage user accounts.

Each user within dual network computing system 100 may have an open network user account and a closed network user account wherein data transport server 114 is communicably coupled to the user's open network account and the user's closed network account. To transport data from closed network 102 to closed network 104 the user provides data to the data storage account of the open network account and if the user wishes to use or access the data within closed network 102, the user switches to second display device 128 and accesses the data transported to the data storage account of the user's closed network user account. Thus, the user can easily switch back and forth between each screen, namely first display device 126 and second display device 128.

Figure 7:
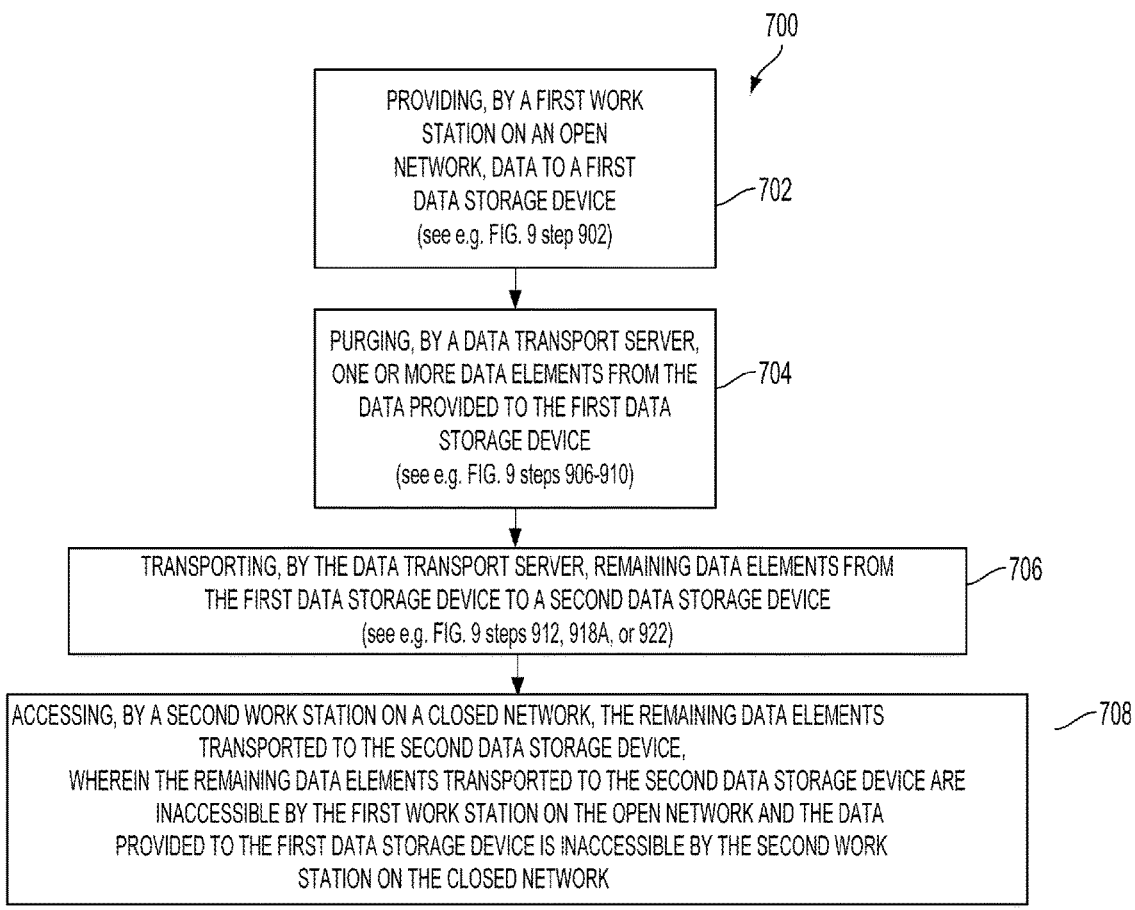
FIG. 7 is a first flow diagram of an illustrative method of operation of the dual network computing system of FIG. 1.

FIG. 7 shows an illustrative method according to the present disclosure for transporting data from open network 102 to closed network 104. More particularly, method 700 transports, to closed network 104, data provided to first data storage device 110 by first workstation 106. As indicated by block 702, data is provided by first workstation 106 within open network 102 to first data storage device 110 within open network 102 (See also step 902 of FIG. 9). As described above, data transport server 114 includes purging module 404, wherein upon detection by data transport server 114 that data was provided to first data storage device 110, processor 402 may command purging module 404 to purge one or more undesired code or data elements from the data (See also step 906 of FIG. 9). Thus, at block 704 of method 700, the data provided to first data storage device 110 is purged of one or more undesired code or data elements, wherein purging is accomplished by purging module 404 within data transport server 114 (See also steps 908 & 910 of FIG. 9). At block 706 method 700 transports, by data transport server 114, remaining data elements from first data storage device 110 to second data storage device 112 (See also steps 912, 918, or 922 of FIG. 9). At block 708 second workstation 108 within closed network 104 accesses the remaining data elements transported to second data storage device 112, wherein the remaining data elements transported to second data storage device 112 is inaccessible by first workstation 106 within open network 102 and the data provided to first data storage device 110 is inaccessible by second workstation 108 within closed network 104.

Figure 8:
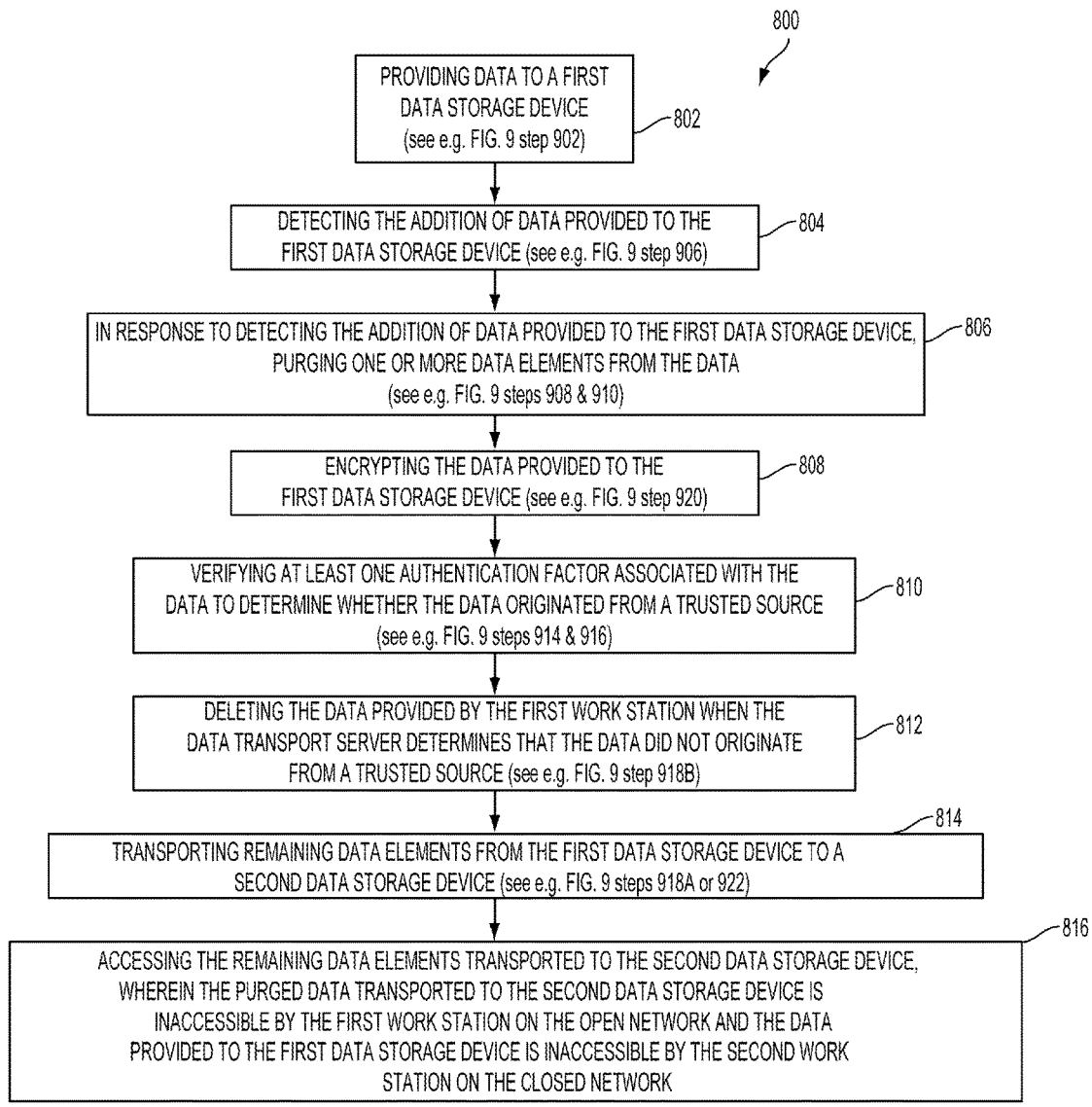
FIG. 8 is a second flow diagram of an illustrative method of operation of the dual network computing system of FIG. 1.

FIG. 8 shows a further illustrative method according to the present disclosure for transporting data from open network 102 to closed network 104. Method 800 comprises substantially the same steps as method 700 and further provides an exemplary method for undertaking data transport server functions described in the illustrative embodiment of FIG. 4. As indicated by block 802, data is provided to first data storage device 110 within open network 102 (See also step 902 of FIG. 9). At block 804 and as described above, data transport server 114 may be configured to detect the addition of data provided to first data storage device 110 (See also step 906 of FIG. 9). Data transport server 114 may be further configured such that, at block 806, processor 402 commands purging module 404 to automatically purge one or more undesired code or data elements from the data provided to first data storage device 110 in response to data transport server 114 detecting the addition of data provided to first data storage device 110 (See also steps 908 & 910 of FIG. 9).

Figure 9:
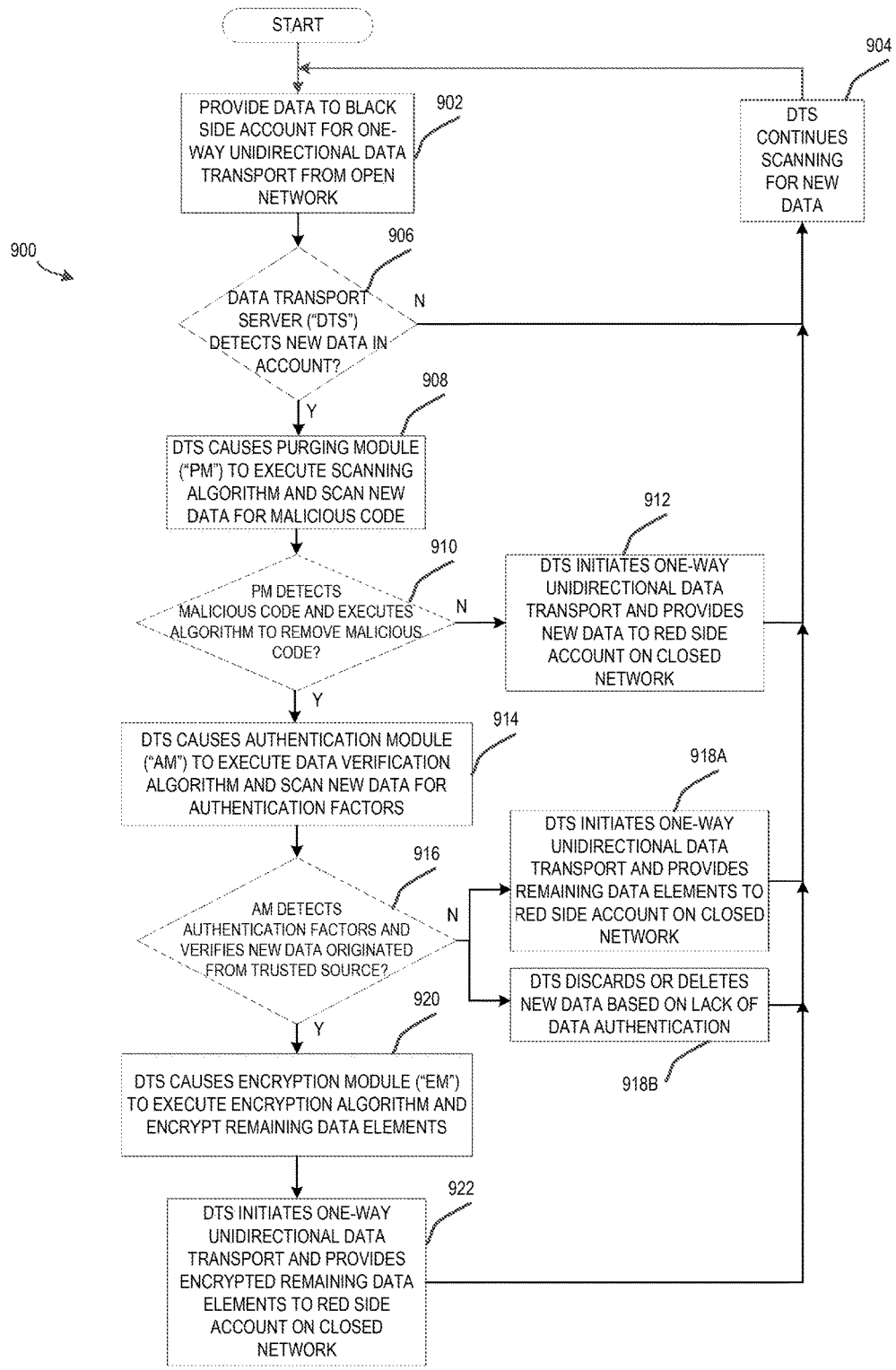
FIG. 9 is a flow diagram of an illustrative method of operation of the data transport server of FIG. 4.

Additionally, data transport server 114 may be further configured such that, at block 808, processor 402 commands encryption module 406 to encrypt the data provided to first data storage device 110 in response to data transport server 114 detecting the addition of data provided to first data storage device 110 (See also step 920 of FIG. 9). Likewise, data transport server 114 may be further configured such that processor 402 commands verification/authentication module 410 to authenticate the data provided to first data storage device 110, thus at block 810 of method 800, verification/authentication module 410 verifies at least one authentication factor associated with the data to determine whether the data originated from a trusted source (See also steps 914 & 916 of FIG. 9).

At block 812 the data provided to first data storage device 110 by first workstation 106 is deleted if data transport server 114 determines that the data did not originate from a trusted source (See also step 918B of FIG. 9). At block 814 method 800 transports, by data transport server 114, the remaining data elements from first data storage device 110 to second data storage device 112 (See also steps 918A or 922 of FIG. 9). At block 816 second workstation 108 within closed network 104 accesses the purged, encrypted, and authenticated data transported to second data storage device 112, wherein the data transported to second data storage device 112 is inaccessible by first workstation 106 within open network 102 and the data provided to first data storage device 110 is inaccessible by second workstation 108 within closed network 104.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

What is claimed is:

1. A dual network computing system comprising:
   a workstation comprising:
      a first computing system communicably coupled with a first data storage system within a first network, the first computing system is configured to access or transmit first network data;
      a second computing system communicably coupled with a second data storage system within a second network, wherein the second network does not communicate outbound data to the first network;
      a keyboard;
      a video display;
      a graphical user interface pointing device; and
      a keyboard video, and graphical user interface pointing device (KVGUIPD) switch that is coupled to the first and second computing systems, the KVGUIPD switch selectively couples the keyboard, the video display, and the graphical user interface pointing device with either said first or said second computing systems, said KVGUIPD switch comprises a mechanical switch that enables coupling of the keyboard, the video display, and the graphical user interface pointing device with either the first or second computing systems while electrically isolating the first and second computing systems from each other;

a data transport server communicably coupled to the first data storage system and the second data storage system, the data transport server including a first network interface configured to receive first network data from the first data storage data system, wherein the first storage system further include a data or file synchronization system or program that automatically replicates the first network data selected for storage on the first data storage system to the data transport server when the first network data is selected for said storage to the first data storage system using the first computing system, wherein the data transport server further includes, and a second network interface configured to transmit data unidirectionally from the data transport server to the second data storage system, wherein the data transport server further includes a purging module, the purging module configured to scan for one or more predefined data elements from the first network data received from the first data storage system, the purging module is further configured to purge said one or more matching data elements from the first network data if detected, wherein the purging module outputs in remaining first network data elements, wherein the data transport server further comprises a second network interface configured to transmit the purging module outputs of remaining first network data elements unidirectionally from the data transport server; and a first data link providing unidirectional data communication from the data transport server's second network interface to the second data storage system, wherein the second network interface and the first data link is implemented using a physical and logical one-way interface/data transport link with the second storage system;

the data transport server includes logic that overrides a purging function of the purging module when the data transport server verifies at least one authentication factor associated with one or more of the first plurality of data to determine whether the one or more of the first plurality of data originated from a trusted source; and wherein the one or more of the first plurality of data include a binary data file and the at least one authentication factor includes a digital signature associated with at least one of the binary data file;

a second data blocking device communicably coupled to an encryption device, wherein the second data blocking device is configured to block first network data not selected for storage in the first data storage system via the first computing system from entering the second network comprising a closed network portion of the dual network computing system, and the second data routing device is communicably coupled to the encryption device, wherein the encryption device encrypts data transmitted by the second data routing device;

wherein the encryption device and the second data blocking device are configured to enable encrypted isolation between first network data not selected for storage in the first data storage system via the first computing system that is external to the second network's closed network portion and data internal to the closed network portion.

2. The dual network computing system of claim 1, wherein the purging module is configured to produce the remaining first network data by purge actions by removing:
the one or more data elements that comprise executable file or program; and
removing the one or more data elements that comprise data elements that are configured to at least one of 1) degrade functionality of the dual network computing system, 2) cause unauthorized access to the dual network computing system, or 3) exfiltrate data from the dual network computing system.

3. The dual network computing system of claim 2, wherein the purging module is configured to purge by: removing the one or more data elements that comprise data file types including at least one of EXE file type, APP file type, INS file type, IPA file type, PIF file type, RUN file type, VB file type, VBS file type, VBE file type, WS file type or WSF file type.

4. The dual network computing system of claim 1, further including a first data routing device communicably coupled to the first computing system and communicably coupled to the first data storage system, wherein the first data routing device enables data communication between the first computing system and the first data storage system.

5. The dual network computing system of claim 4, further including a first data blocking device communicably coupled to the first data routing device, wherein the first data blocking device is configured to block data from entering an open network portion.

6. The dual network computing system of claim 1, further including a second data routing device communicably coupled to the second computing system and communicably coupled to the second data storage system, wherein the second data routing device enables data communication between the second computing system and the second data storage data system.

7. The dual network computing system of claim 1, wherein the second network's closed network portion further includes a control server having a plurality of nodes, wherein each node is configured to host at least one of a plurality of virtual computing environments.

8. The dual network computing system of claim 7, wherein the second computing system includes at least one of an operating system partition and a data partition, and the operating system partition is configured to host at least one of a plurality of operating systems.

9. The dual network computing system of claim 8, further including a plurality of interconnected second computing systems wherein each second computing systems each respectively includes an operating system partition configured to host at least one of a plurality of operating systems and the control server is configured to distribute updates to the operating systems resident on each of the plurality of interconnected second computing systems.

10. The dual network computing system of claim 1, wherein the first computing system is in data communication with the first data storage system, such that data accessed by the first computing system may be stored in the first data storage system.

11. The dual network computing system of claim 1, wherein the data transport server includes logic that overrides a purging function of the purging module when the data transport server verifies at least one authentication factor associated with one or more data files comprising the first network data selected for storage on the first data storage system from the first computing system to determine whether the one or more data files originated from a trusted source and therefore will not be purged or removed from the first network data by the purging module.

12. A method of operating a dual network computing system comprising the steps of:
providing a workstation comprising:
a first computing system communicably coupled with a first data storage system within first network, the first computing system is configured to access or transmit first network data;
a second computing system communicably coupled with a second data storage system within a second network, wherein the second network does not communicate outbound data to the first network;
a keyboard;
a video display;
a graphical user interface pointing device; and
a keyboard video, and graphical user interface pointing device (KVGUIPD) switch that is coupled to the first and second computing systems, the KVGUIPD switch selectively couples the keyboard, the video display, and the graphical user interface pointing device with either said first or said second computing systems, said KVGUIPD switch comprises a mechanical switch that enables coupling of the keyboard, the video display, and the graphical user interface pointing device with either the first or second computing systems while electrically isolating the first and second computing systems from each other from each other;
providing a data transport server communicably coupled to the first data storage system and the second data storage system, the data transport server including a first network interface configured to receive first network data from the first data storage data system, wherein the first storage system further include a data or file synchronization system or program that automatically replicates the first network data selected for storage on the first data storage system to the data transport server when the first network data is selected for said storage to the first data storage system using the first computing system, wherein the data transport server further includes a second network interface configured to transmit data unidirectionally from the data transport server to the second data storage system, wherein the data transport server further includes a purging module, the purging module configured to scan for one or more predefined data elements from the first network data received from the first data storage system, the purging module is further configured to purge said one or more matching data elements from the first network data if detected, wherein the purging module outputs remaining first network data elements, wherein the data transport server further comprises a second network interface configured to transmit the purging module outputs of remaining first network data elements unidirectionally from the data transport server;
providing a first data link providing unidirectional data communication from the data transport server's second network interface to the second data storage system, wherein the second network interface and the first data link is implemented using a physical and logical one-way interface/data transport link with the second storage system;
providing, by the first computing system, a first plurality of data comprising the first network data to the first data storage data system device from a source within the first network comprising an open network section;
scanning, by the purging module, the first plurality of data communicated from the first storage device to the data transport server;
following the scanning step, identifying, by the purging module, one or more said one or more first data elements to be purged from the first plurality of data provided to the first data storage system;
following the identifying step, purging, by the purging module, the one or more identified one or more first data elements wherein purging includes isolating remaining one or more second data elements from the identified one or more first data elements to create said remaining first network data elements;
the data transport server includes logic that overrides a purging function of the purging module when the data transport server verifies at least one authentication factor associated with one or more of the first plurality of data to determine whether the one or more of the first plurality of data originated from a trusted source; and
wherein the one or more of the first plurality of data include a binary data file and the at least one authentication factor includes a digital signature associated with at least one of the binary data file;
transporting, by the data transport server, said remaining first network data elements remaining one or more second data elements from the data transport server to the second data storage system wherein said transporting is accomplished by way of the first data link; and
a second data blocking device communicably coupled to an encryption device, wherein the second data blocking device is configured to block first network data not selected for storage in the first data storage system via the first computing system from entering the second network comprising a closed network portion of the dual network computing system, and the second data routing device is communicably coupled to the encryption device, wherein the encryption device encrypts data transmitted by the second data routing device;
wherein the encryption device and the second data blocking device are configured to enable encrypted isolation between first network data not selected for storage in the first data storage system via the first computing system that is external to the second network's closed network portion and data internal to the closed network portion;
accessing, by the second computing system coupled to the second network defining a closed network, the remaining first network data elements transported to the second data storage system.

13. The method of claim 12, further including a step of encrypting the first plurality of data after providing the first plurality of data to the first data storage system, wherein encrypting is accomplished by way of an encryption module within the data transport server.

14. The method of claim 12, wherein the steps of scanning, identifying and purging the one or more data elements occurs automatically by the purging module after the first plurality of data is provided to the second data storage system.

15. The method of claim 14, wherein the step of purging the data includes at least one of:
removing the one or more of the one or more first data elements that are executable data elements; and removing the one or more data elements that are configured to at least one of 1) degrade functionality of the second network portion of the dual network computing system, 2) cause unauthorized access to the second network portion of the dual network computing system, or 3) exfiltrate data from the second network portion of the dual network computing system.

16. The method of claim 15, further including the steps of providing, by the first computing system, one or more of the first plurality of data to the first data storage system, and verifying, by the data transport server, at least one authentication factor associated with the one or more of the first plurality of data to determine whether the one or more of the first plurality of data originated from a trusted source.

17. The method of claim 16, wherein the data transport server automatically deletes the one or more of the first plurality of data provided by the first computing system when the data transport server determines that the one or more of the first plurality of data did not originate from a trusted source.

* * * * *